(12) United States Patent
Yamada et al.

(10) Patent No.: US 11,660,691 B2
(45) Date of Patent: May 30, 2023

(54) REAMER

(71) Applicants: SUMITOMO ELECTRIC HARDMETAL CORP., Itami (JP); Sumitomo Electric Tool Net, Inc., Osaka (JP)

(72) Inventors: Masashi Yamada, Itami (JP); Masaaki Jindai, Itami (JP); Jun Okamoto, Osaka (JP); Futoshi Takeshita, Osaka (JP); Kyosuke Kai, Kashiba (JP); Katsutoshi Fukuda, Kashiba (JP)

(73) Assignees: SUMITOMO ELECTRIC HARDMETAL CORP., Itami (JP); Sumitomo Electric Tool Net, Inc., Osaka (JP)

( * ) Notice: Subject to any disclaimer, the term of this patent is extended or adjusted under 35 U.S.C. 154(b) by 0 days.

(21) Appl. No.: 17/253,896

(22) PCT Filed: Mar. 10, 2020

(86) PCT No.: PCT/JP2020/010276
§ 371 (c)(1),
(2) Date: Dec. 18, 2020

(87) PCT Pub. No.: WO2021/181518
PCT Pub. Date: Sep. 16, 2021

(65) Prior Publication Data
US 2022/0048125 A1 Feb. 17, 2022

(51) Int. Cl.
*B23D 77/00* (2006.01)
*B23D 77/12* (2006.01)
(52) U.S. Cl.
CPC .............. *B23D 77/00* (2013.01); *B23D 77/12* (2013.01); *B23D 2277/2464* (2013.01)

(58) Field of Classification Search
CPC . B23D 77/00; B23D 77/12; B23D 2277/2464
See application file for complete search history.

(56) References Cited

U.S. PATENT DOCUMENTS

| 5,178,645 A | 1/1993 | Nakamura et al. | |
| 5,238,335 A * | 8/1993 | Nomura | B23D 77/02 408/199 |

(Continued)

FOREIGN PATENT DOCUMENTS

| EP | 1561535 A1 * | 8/2005 | ............ B23C 3/051 |
| JP | H04-193406 A | 7/1992 | |

(Continued)

OTHER PUBLICATIONS

Translation of WO-2016010028-A1, translated by the WIPO website on Aug. 8, 2022.*

*Primary Examiner* — Eric A. Gates
(74) *Attorney, Agent, or Firm* — Faegre Drinker Biddle & Reath LLP

(57) ABSTRACT

A reamer is rotated about a central axis and has, in a direction along a central axis, a tool front end and a tool rear end that is an end opposite to the tool front end. The reamer includes a blade on a tool front end side. The blade has, on a circumferential surface, a chamfered cutting edge located on the tool front end side, a circumferential cutting edge contiguous to an end of the chamfered cutting edge on a tool rear end side, and a margin that is a surface contiguous to the circumferential cutting edge. The circumferential cutting edge includes a front end portion between a first position and a second position, the first position being an end on a chamfered cutting edge side, the second position having a distance of 1 mm from the first position in a direction of extension of the circumferential cutting edge.

4 Claims, 7 Drawing Sheets

(56) References Cited

U.S. PATENT DOCUMENTS

| | | | | |
|---|---|---|---|---|
| 5,921,728 | A * | 7/1999 | Kammeraad | B23D 77/00 408/230 |
| 6,547,495 | B2 * | 4/2003 | Meece | B23D 77/00 408/230 |
| 6,918,943 | B2 * | 7/2005 | Kuwabara | B23B 51/02 75/238 |
| 8,272,815 | B2 * | 9/2012 | Takiguchi | B23C 3/055 408/144 |
| 8,641,334 | B2 * | 2/2014 | Takiguchi | B23D 77/042 407/45 |
| 10,994,339 | B2 * | 5/2021 | Tanaka | C23C 28/042 |
| 11,198,187 | B2 * | 12/2021 | Okamoto | B23D 77/006 |
| 11,224,921 | B2 * | 1/2022 | Sasaki | B23D 77/00 |
| 2003/0072937 | A1 | 4/2003 | Uesaka et al. | |
| 2005/0145066 | A1 | 7/2005 | Tajima et al. | |
| 2012/0269591 | A1 * | 10/2012 | Shimada | B23B 51/08 408/230 |
| 2013/0195572 | A1 * | 8/2013 | Hiraki | B23D 77/006 408/1 R |
| 2020/0230708 | A1 | 7/2020 | Miyazaki et al. | |

FOREIGN PATENT DOCUMENTS

| | | | |
|---|---|---|---|
| JP | H06-312319 | A | 11/1994 |
| JP | H08-71845 | A | 3/1996 |
| JP | 2724120 | B2 * | 3/1998 |
| JP | 2001-9625 | A | 1/2001 |
| JP | 2001-322884 | A | 11/2001 |
| JP | 2006-88229 | A | 4/2006 |
| JP | 2008-229757 | A | 10/2008 |
| JP | 2009-39811 | A | 2/2009 |
| JP | 2010-125532 | A | 6/2010 |
| JP | 2013-035101 | A | 2/2013 |
| JP | 2017-193006 | A | 10/2017 |
| WO | WO-2016010028 | A1 * | 4/2017 |
| WO | WO 2019/073752 | | 4/2019 |
| WO | WO 2019/073752 | A1 | 4/2019 |

* cited by examiner

REAMER

TECHNICAL FIELD

The present disclosure relates to reamers.

BACKGROUND ART

PTL 1 (Japanese Patent Laying-Open No. 2013-035101) discloses a reamer. The reamer disclosed in PTL 1 has a blade. The blade has, on its circumferential surface, a margin and a cutting edge (circumferential cutting edge) contiguous to the margin.

CITATION LIST

Patent Literature

PTL 1: Japanese Patent Laying-Open No. 2013-035101

SUMMARY OF INVENTION

A reamer of the present disclosure is rotated about a central axis and has, in a direction along a central axis, a tool front end and a tool rear end that is an end opposite to the tool front end. The reamer includes a blade on a tool front end side. The blade has, on a circumferential surface, a chamfered cutting edge located on the tool front end side, a circumferential cutting edge contiguous to an end of the chamfered cutting edge on a tool rear end side, and a margin that is a surface contiguous to the circumferential cutting edge. The circumferential cutting edge includes a front end portion between a first position and a second position, the first position being an end on a chamfered cutting edge side, the second position having a distance of 1 mm from the first position in a direction of extension of the circumferential cutting edge. As viewed from a direction passing through the central axis and the circumferential cutting edge and being orthogonal to the central axis, a maximum length of chipping in a direction orthogonal to the direction of extension of the circumferential cutting edge is less than 10 μm at the front end portion, the chipping extending from the circumferential cutting edge to the margin.

DETAILED DESCRIPTION

Figure 1:
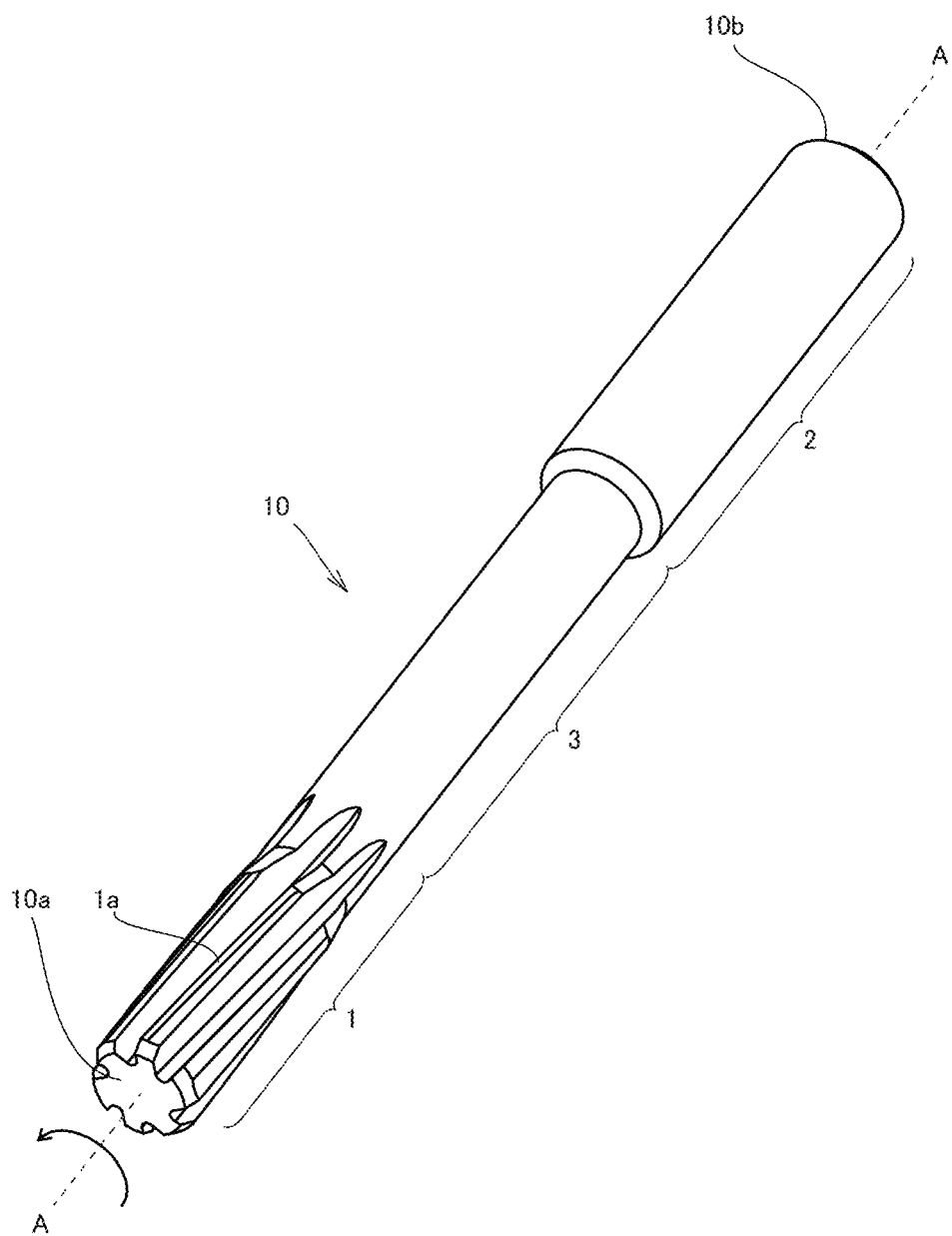
FIG. 1 is a perspective view of a reamer 10.

Problem to be Solved by the Present Disclosure

In manufacture of a reamer, chipping may remain in a circumferential cutting edge. Chipping remaining in the circumferential cutting edge affects the processing quality in an inner wall surface of a hole, which is a processing target (the processing quality in the inner wall surface of the hole, which is a processing target, increases as an arithmetic mean roughness Ra (or maximum height roughness Rz) in the inner wall surface decreases). In the reamer disclosed in PTL 1, however, no consideration is particularly given to chipping that occurs in a cutting edge during manufacture.

An object of the present disclosure is to provide a reamer that can improve processing quality in an inner wall surface of a hole, which is a processing target.

Advantageous Effect of the Present Disclosure

With a reamer according to the present disclosure, the processing quality in the inner wall surface of the hole, which is a processing target, can be improved.

Description of Embodiments

First, embodiments of the present disclosure are listed and described.

(1) A reamer according to an embodiment is rotated about a central axis and has, in a direction along the central axis, a tool front end and a tool rear end that is an end opposite to the tool front end. The reamer includes a blade on a tool front end side. The blade has, on a circumferential surface, a chamfered cutting edge located on the tool front end side, a circumferential cutting edge contiguous to an end of the chamfered cutting edge on a tool rear end side, and a margin that is a surface contiguous to the circumferential cutting edge. The circumferential cutting edge includes a front end portion between a first position and a second position, the first position being an end on a chamfered cutting edge side, the second position having a distance of 1 mm from the first position in a direction of extension of the circumferential cutting edge. As viewed from a direction passing through the central axis and the circumferential cutting edge and being orthogonal to the central axis, a maximum length of chipping in a direction orthogonal to the direction of extension of the circumferential cutting edge is less than 10 μm at the front end portion, the chipping extending from the circumferential cutting edge to the margin.

With the reamer according to (1) above, the processing quality in the inner wall surface of the hole, which is a processing target, can be improved.

(2) In the reamer of (1) above, the blade may be back tapered such that a diameter of a circumcircle of the blade in a cross-section orthogonal to the central axis decreases by not less than 0.05 mm as a distance from the tool front end for increases per 100 mm.

With the reamer according to (2) above, the processing quality in the inner wall surface of the hole, which is a processing target, can be improved even when burnishing owing to a margin acts less easily due to a large back taper.

(3) In the reamer of (1) or (2) above, the blade may be made of a cemented carbide including metal carbide particles. The metal carbide particles may have a mean particle size of not greater than 0.8 μm.

With the reamer according to (3) above, the processing quality in the inner wall surface of the hole, which is a processing target, can be improved further.

Detailed Description of Embodiments of the Present Disclosure

An embodiment will now be described in detail with reference to the drawings. In the drawings, the same or like parts are denoted by the same reference signs, and redundant description will not be repeated.

(Configuration of Reamer According to Embodiment)

A configuration of a reamer (hereinafter referred to as "reamer 10") according to an embodiment will be described below.

<Schematic Structure of Reamer According to Embodiment>

Figure 2:
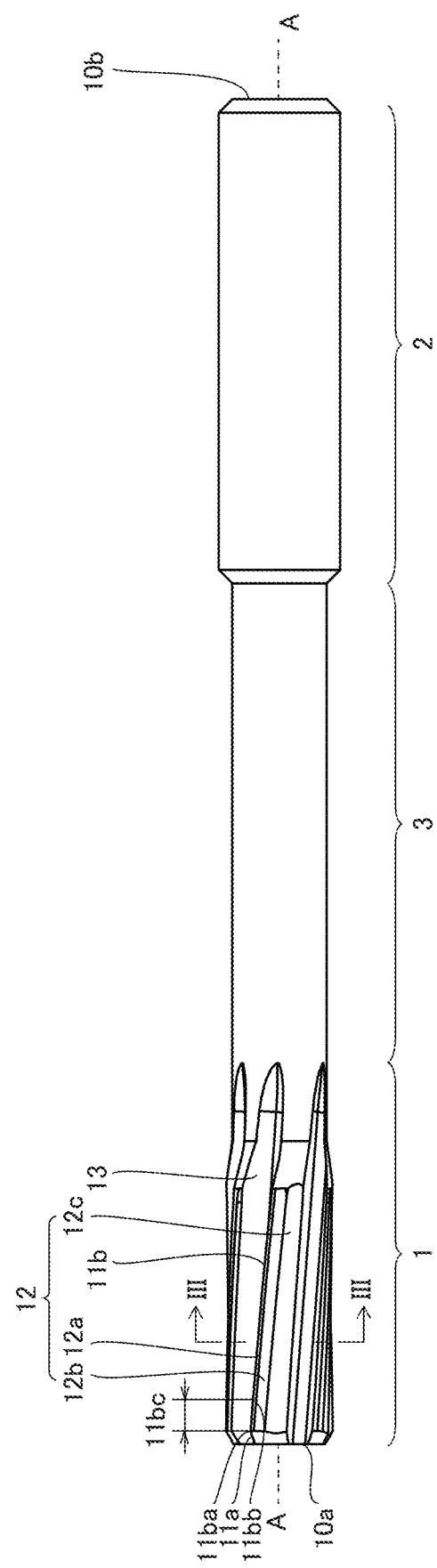
FIG. 2 is a side view of reamer 10.
Figure 3:
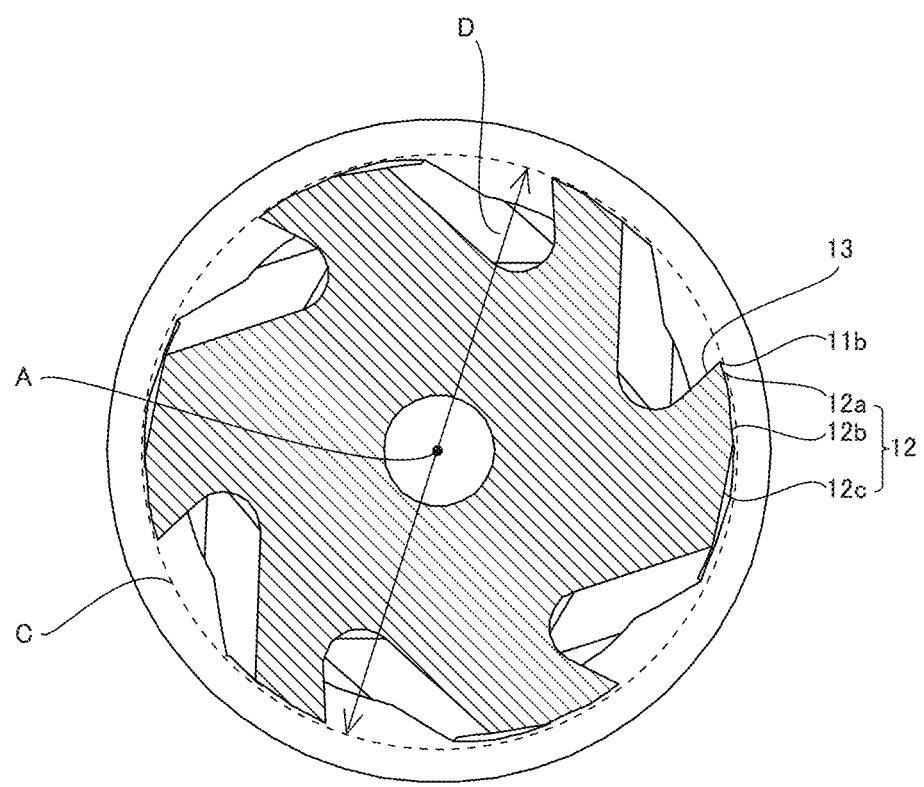
FIG. 3 is a sectional view taken along III-III of FIG. 2.
Figure 4:
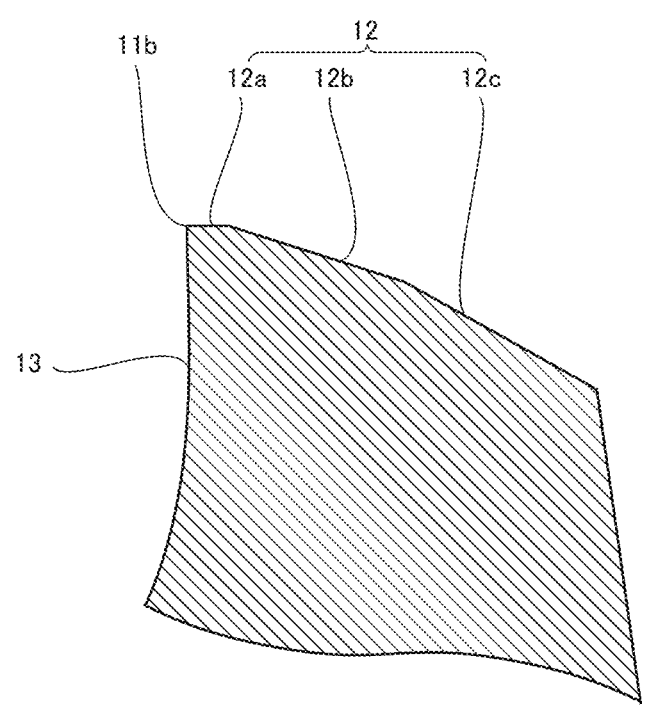
FIG. 4 is an enlarged schematic view of a vicinity of a circumferential cutting edge 11b in FIG. 3.

FIG. 1 is a perspective view of reamer 10. FIG. 2 is a side view of reamer 10. FIG. 3 is a sectional view taken along of FIG. 2. FIG. 4 is an enlarged schematic view of a vicinity of a circumferential cutting edge 11b in FIG. 3. As shown in FIGS. 1, 2, 3, and 4, reamer 10 is rotatable about a central axis A. The direction of rotation of reamer 10 is indicated by the arrow in FIG. 1.

Reamer 10 has a tool front end 10a and a tool rear end 10b. Tool front end 10a is one end in the direction along central axis A. Tool rear end 10b is the other end in the direction along central axis A.

Reamer 10 has a blade 1, a shank 2, and a neck 3. Blade 1 is located on a tool front end 10a side. Shank 2 is located on a tool rear end 10b side. Neck 3 is located between blade 1 and shank 2 in the direction along central axis A and connects blade 1 with shank 2. Preferably, blade 1, shank 2, and neck 3 are formed integrally. In other words, reamer 10 is preferably a solid reamer.

Blade 1 has a circumferential surface 1a. Blade 1 has, on circumferential surface 1a, a chamfered cutting edge 11a, a circumferential cutting edge 11b, a land 12, and a flute 13.

Chamfered cutting edge 11a is located on the tool front end 10a side and extends from the tool front end 10a side to the tool rear end 10b side. Circumferential cutting edge 11b is contiguous to an end of chamfered cutting edge 11a which is located on the tool rear end 10b side. Circumferential cutting edge 11b extends from chamfered cutting edge 11a toward tool rear end 10b.

The description that "circumferential cutting edge 11b extends from chamfered cutting edge 11a toward tool rear end 10b" includes both of a case where the direction of extension of circumferential cutting edge 11b is inclined relative to central axis A (i.e., helix edge) and a case where the direction of extension of circumferential cutting edge 11b is parallel to central axis A (i.e., straight edge). From another perspective, a helix angle of circumferential cutting edge 11b (an angle formed between the direction of extension of circumferential cutting edge 11b and the direction along central axis A) is not particularly limited.

Land 12 has a margin 12a, a second flank face 12b, and a third flank face 12c. Margin 12a is a surface contiguous to circumferential cutting edge 11b. Second flank face 12b is a surface contiguous to margin 12a from opposite to circumferential cutting edge 11b. Third flank face 12c is a surface contiguous to second flank face 12b from opposite to margin 12a. Margin 12a is formed of, for example, a curved surface (more specifically, cylindrical surface). Second flank face 12b and third flank face 12c each may be formed of, for example, a flat surface.

Circumferential surface 1a is recessed toward the inside of blade 1 in flute 13. Margin 12a is contiguous to flute 13 on the side opposite to second flank face 12b. From another perspective, circumferential cutting edge 11b is formed at a ridgeline between margin 12a and flute 13. A portion of flute 13 which is contiguous to margin 12a and faces in the direction of rotation of reamer 10 (more specifically, a portion located on the side close to margin 12a relative to the bottom of flute 13) is a rake face of reamer 10.

<Detailed Configuration of Circumferential Cutting Edge>

An end of circumferential cutting edge 11b on a chamfered cutting edge 11a side is defined as a first position 11ba. A position with a distance of 1 mm from first position 11ba in the direction of extension of circumferential cutting edge 11b is defined as a second position 11bb. Circumferential cutting edge 11b has a front end portion 11bc between first position 11ba and second position 11bb.

Chipping generated in manufacture may extend from circumferential cutting edge 11b to margin 12a. As seen from the direction passing through circumferential cutting edge 11b and central axis A and being orthogonal to central axis A, the maximum length of the chipping in the direction orthogonal to the direction of extension of circumferential cutting edge 11b is less than 10 μm at front end portion 11bc.

The maximum length of the chipping at front end portion 11bc is measured with a Keyence digital microscope VHX-5000 (hereinafter referred to as "microscope").

More specifically, first, the microscope is adjusted and the arrangement of reamer 10 is adjusted such that the direction of observation passes through circumferential cutting edge 11b and central axis A and is orthogonal to central axis A and that the direction of extension of circumferential cutting edge 11b coincides with the horizontal direction (i.e., such that an angle formed between the direction along central axis A and the horizontal direction coincides with the helix angle of circumferential cutting edge 11b).

Second, a vicinity of front end portion 11bc is photographed under the microscope. Third, image analysis using image processing software is performed on a taken photograph, to thereby obtain the maximum length of the chipping in the direction orthogonal to the direction of extension of circumferential cutting edge 11b.

<Back Taper of Blade>

An amount of back taper of blade 1 per 100 mm is preferably not less than 0.05 mm. Specifically, blade 1 may be back tapered such that a diameter D of a circumcircle C (indicated by the dotted line in FIG. 3) of blade 1 in a cross-section orthogonal to central axis A decreases by not less than 0.05 mm as a distance from tool front end 10a increases per 100 mm. Note that the amount of back taper of blade 1 per 100 mm described above is preferably not greater than 0.20 mm.

<Constituent Material of Reamer>

Reamer 10 (blade 1, shank 2, and neck 3) is made of, for example, a cemented carbide. The cemented carbide contains metal carbide particles and a binder. The metal carbide particles are, for example, particles of tungsten carbide (WC). The binder is, for example, cobalt (Co).

Preferably, the metal carbide particles in the cemented carbide of reamer 10 have a mean particle size of not greater than 0.8 μm. Further preferably, the metal carbide particles in the cemented carbide of reamer 10 have a mean particle size of not greater than 0.5 μm.

The mean particle size of the metal carbide particles in the cemented carbide of reamer 10 is calculated by the Fullman's equations below:

$$d_m = \left(\frac{4}{\pi}\right) \cdot \left(\frac{N_L}{N_S}\right) \quad \text{[Math 1]}$$

$$N_L = \frac{n_L}{L}$$

$$N_S = \frac{n_s}{S}$$

where $d_m$ is the mean particle size of metal carbide particles, $N_L$ is the number of metal carbide particles per unit length hit by any appropriate straight line on sectional structure, $N_S$ is the number of metal carbide particles included in any appropriate unit area, $n_L$, is the number of metal carbide particles hit by any appropriate straight line on sectional structure, $n_S$ is the number of metal carbide particles included in an any appropriate measurement region, L is the length of any appropriate straight line on sectional structure, and S is the area of any appropriate measurement region.

In measurement of the mean particle size of metal carbide particles, first, the ground sectional structure of reamer 10 is photographed in ×10000 under a scanning electron microscope (SEM), and an obtained photograph is taken as a measurement region. This photographing is performed such that $n_S$ is not less than 1000. A value of $n_S$ and a value of S are obtained from this photograph. Second, any appropriate straight line equally dividing the obtained photograph is drawn, and the number of metal carbide particles hit by the straight line is counted, to thereby obtain a value of $n_L$. A value of L is obtained from the length of this straight line.

The value of $n_S$ and the value of $n_L$ obtained as described above are divided respectively by the value of S and the value of L to obtain a value of $N_S$ and a value of $N_L$, and the obtained value of $N_S$ and the obtained value of $N_L$ are substituted into the above equations to obtain a value of $d_m$ (a mean particle size of metal carbide particles).

(Method of Manufacturing Reamer According to Embodiment)

A method of manufacturing reamer 10 will be described below.

Figure 5:
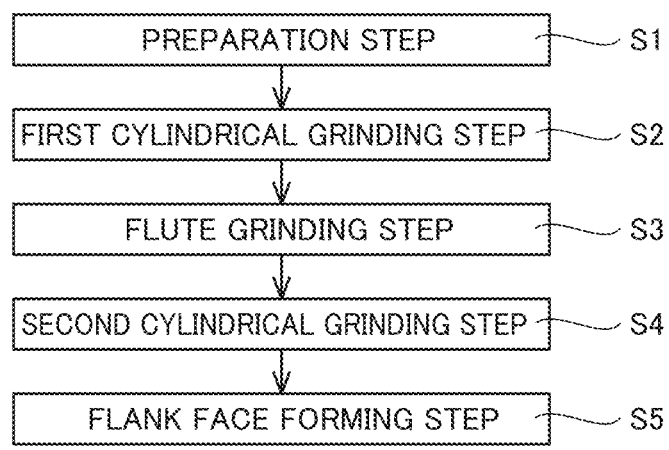
FIG. 5 is a flowchart for manufacturing reamer 10.

FIG. 5 is a flowchart for manufacturing reamer 10. As shown in FIG. 5, the method of manufacturing reamer 10 includes a preparation step S1, a first cylindrical grinding step S2, a flute grinding step S3, a second cylindrical grinding step S4, and a flank face forming step S5.

Figure 6:
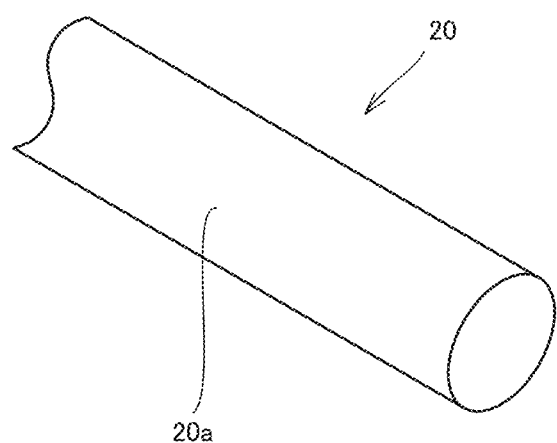
FIG. 6 is a schematic perspective view of a processing target member 20.

At preparation step S1, a processing target member 20 is prepared. FIG. 6 is a schematic perspective view of processing target member 20. As shown in FIG. 6, processing target member 20 has a cylindrical shape. Processing target member 20 has a circumferential surface 20a. Processing target member 20 is made of a cemented carbide.

At first cylindrical grinding step S2, cylindrical grinding is performed on circumferential surface 20a. Cylindrical grinding on circumferential surface 20a may include, for example, a roughing step and a semi finishing step performed after the roughing step. The processing quality through the semi finishing step is higher than the processing quality through the roughing step (the surface roughness of circumferential surface 20a after the semi finishing step is lower than the surface roughness of circumferential surface 20a after the roughing step).

Figure 7:
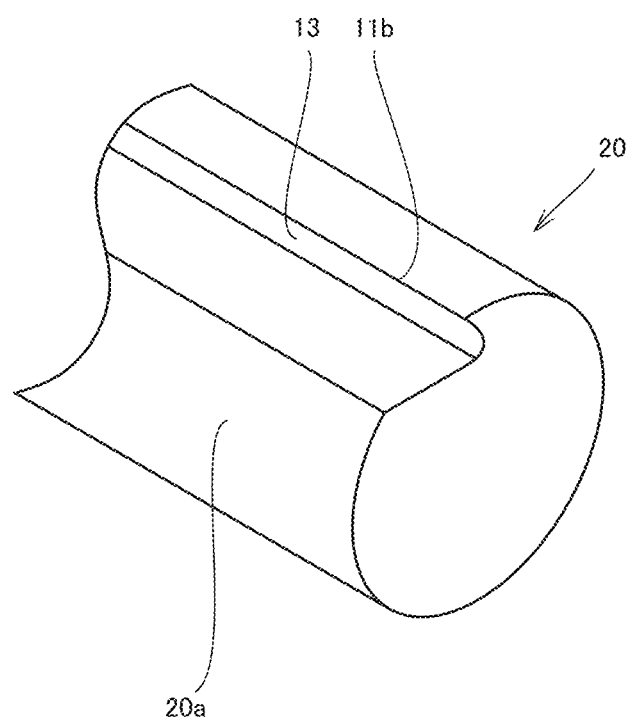
FIG. 7 is a schematic perspective view of processing target member 20 after a flute grinding step S3.

FIG. 7 is a schematic perspective view of processing target member 20 after flute grinding step S3. As shown in FIG. 7, at flute grinding step S3, circumferential surface 20a is ground to form flute 13. Note that a ridgeline between flute 13 and circumferential surface 20a is circumferential cutting edge 11b. According to the findings of the present inventors, chipping may be formed in circumferential cutting edge 11b at flute grinding step S3.

At second cylindrical grinding step S4, cylindrical grinding is performed on circumferential surface 20a except for flute 13. Through the cylindrical grinding performed at second cylindrical grinding step S4, chipping of circumferential cutting edge 11b generated at flute grinding step S3 is eliminated at least partially. Note that the processing quality through the second cylindrical grinding step is higher than the processing quality through the first cylindrical grinding step (the surface roughness of circumferential surface 20a after second cylindrical grinding step S4 is lower than the surface roughness of circumferential surface 20a after first cylindrical grinding step S2).

At flank face forming step S5, circumferential surface 20a is ground to form land 12 (margin 12a, second flank face 12b, and third flank face 12c). Consequently, reamer 10 having the structure shown in FIGS. 1 to 3 is formed.

(Effects of Reamer According to Embodiment)

The effects of reamer 10 will be described below.

When there is long chipping extending from the circumferential cutting edge to the margin, the chipping may be transferred onto an inner wall surface of a hole, which is a processing target, leading to reduced processing quality in the inner wall surface of the hole, which is a processing target (e.g., increased surface roughness in the inner wall surface of the hole, which is a processing target).

Reamer 10, in which chipping at front end portion 11bc has a maximum length of less than 10 μm, can improve the processing quality in the inner wall surface of the hole, which is a processing target.

When an amount of back taper in the blade is small, the inner wall surface of the hole, which is a processing target, is rubbed against the margin after the inner wall surface of the hole, which is a processing target, has been cut with the circumferential cutting edge. Even when there is long chipping extending from the circumferential cutting edge to the margin, thus, some extent of the processing quality is maintained in the inner wall surface of the hole, which is a processing target (burnishing effect).

When high-efficiency processing (processing in which at least one of a cutting rate and a feed rate is increased) is to be performed, an amount of back taper in the blade needs to be increased for a reduced cutting resistance between a workpiece and the blade. However, since the burnishing effect acts less easily if the amount of back taper in the blade increases (more specifically, if the amount of back taper per 100 mm is not less than 0.05 mm), long chipping extending from the circumferential cutting edge to the margin greatly affects the processing quality in the inner wall surface of the hole, which is a processing target.

Reamer 10, in which the chipping at front end portion 11bc has a maximum length as small as less than 10 μm, can maintain the processing quality in the inner wall surface of the hole, which is a processing target, even when the amount of back taper per 100 mm in blade 1 is not less than 0.05 mm, and accordingly, the burnishing effects acts less easily.

Since chipping is formed as particles of a material (e.g., cemented carbide) of a reamer fall from a circumferential cutting edge, resultant chipping tends to have a smaller length as particles have a smaller mean particle size in the material of the reamer. When the metal carbide particles in the cemented carbide of reamer 10 have a mean particle size of not greater than 0.8 μm (not greater than 0.5 μm), thus, chipping is reduced in size, leading to further improved processing quality in the inner wall surface of the hole, which is a processing target.

EXAMPLE

A process test performed to check the effects of reamer 10 will be described below.

<Process Test Conditions>

Sample 1, sample 2, sample 3, sample 4, sample 5, and sample 6 were used in the process test. Sample 1, sample 2, and sample 3 corresponded to the configuration of reamer 10. Sample 4, sample 5, and sample 6 were similar in configuration to reamer 10 except for that the maximum length of chipping at front end portion 11bc was not less than 10 μm.

Sample 1, sample 2, sample 3, sample 4, sample 5, and sample 6 were made of a cemented carbide. Sample 1, sample 2, sample 3, sample 4, sample 5, and sample 6 had a diameter of 8 mm at first position 11ba. In sample 1, sample 2, sample 3, sample 4, sample 5, and sample 6, circumferential cutting edge 11b had a helix angle of 5°.

The chipping had a maximum length of not greater than 4 μm at front end portion 11bc in sample 1, and the chipping had a maximum length of 7 μm at front end portion 11bc in sample 2. The chipping had a maximum length of 9 μm at front end portion 11bc in sample 3.

The chipping had a maximum length of 10 μm at front end portion 11bc in sample 4, and the chipping had a maximum length of 18 μm at front end portion 11bc in sample 5. The chipping had a maximum length of 19 μm at front end portion 11bc in sample 6. Note that the amount of back taper per 100 mm was set to 0.05 mm in blade 1 of each of sample 1, sample 2, sample 3, sample 4, sample 5, and sample 6.

Two types of processing conditions (hereinafter, two types of processing conditions are referred to as "first conditions" and "second conditions") were applied to the process test. In the first conditions, a cutting rate was 120 m/min, and a feed rate was 1.2 mm/rev. In the second condition, a cutting rate was 150 m/min, and a feed rate was 1.5 mm/rev. Carbon steel for machine construction S50C was used for the workpiece in the process test.

Table 1 shows the maximum length of chipping of each of sample 1, sample 2, sample 3, sample 4, sample 5, and sample 6 and the processing conditions applied to the process test.

TABLE 1

|  |  | Sample 1 | Sample 2 | Sample 3 | Sample 4 | Sample 5 | Sample 6 |
| --- | --- | --- | --- | --- | --- | --- | --- |
| Maximum length of chipping at front end portion 11c (μm) |  | 4 or less | 7 | 9 | 10 | 18 | 19 |
| First processing conditions | Cutting rate (m/min) |  |  | 120 |  |  |  |
|  | Feed rate (mm/rev) |  |  | 1.2 |  |  |  |
| Second processing conditions | Cutting rate (m/min) |  |  | 150 |  |  |  |
|  | Feed rate (mm/rev) |  |  | 1.5 |  |  |  |

<Results of Process Test>

As shown in Table 2, the surface roughness (arithmetic mean roughness Ra and maximum height Rz) in the inner wall surface of the hole, being a processing target, decreased with a decreasing maximum length of the chipping at front end portion 11bc. In particular, when the maximum length of the chipping at front end portion 11bc fell below 10 μm, the surface roughness in the inner wall surface of the hole, being a processing target, greatly decreased. A similar trend was found when the cutting rate and feed rate increased. The test results have also experimentally revealed that the processing quality of the inner wall surface of the hole, which is a processing target, is improved with reamer 10.

TABLE 2

|  |  | Sample 1 | Sample 2 | Sample 3 | Sample 4 | Sample 5 | Sample 6 |
| --- | --- | --- | --- | --- | --- | --- | --- |
| First processing conditions | Ra (μm) | 0.1 | 0.2 | 0.2 | 0.5 | 0.6 | 0.7 |
|  | Rz (μm) | 0.9 | 1.1 | 1.2 | 3.3 | 3.1 | 3.5 |
| Second processing conditions | Ra (μm) | 0.1 | 0.1 | 0.1 | 0.4 | 0.3 | 0.2 |
|  | Rz (μm) | 0.8 | 0.7 | 0.9 | 2.5 | 2.1 | 1.7 |

(Effects of Method of Manufacturing Reamer According to Embodiment)

Effects of the method of manufacturing reamer 10 will be described below.

According to the findings of the present inventors, chipping at circumferential cutting edge 11b is formed at flute grinding step S3. When first cylindrical grinding step S2 and second cylindrical grinding step S4 are performed after flute grinding step S3, accordingly, the chipping formed at flute grinding step S3 may remain.

In the method of manufacturing reamer 10, however, second cylindrical grinding step S4 is performed after flute grinding step S3, and accordingly, at least a part of the chipping formed at flute grinding step S3 is eliminated. The method of manufacturing reamer 10 can thus restrain chipping from remaining at circumferential cutting edge 11b.

The embodiment disclosed herein is illustrative and non-restrictive in every respect. The scope of the present invention is defined by the terms of the claims, rather than the embodiment described above, and is intended to include any modifications within the scope and meaning equivalent to the terms of the claims.

REFERENCE SIGNS LIST 10 reamer; 10a tool front end; 10b tool rear end; 1 blade; 1a circumferential surface; 11a chamfered cutting edge; 11b circumferential cutting edge; 11ba first position; 11bb second position; 11bc front end portion; 12 land; 12a margin; 12b second flank face; 12c third flank face; 13 flute; 2 shank; 3 neck; 20 processing target member; 20a circumferential surface; A central axis; C circumcircle; D diameter; S1 preparation step; S2 first cylindrical grinding step; S3 flute grinding step; S4 second cylindrical grinding step; S5 flank face forming step.

The invention claimed is:

1. A reamer that is rotated about a central axis and has, in a direction along the central axis, a tool front end and a tool rear end that is an end opposite to the tool front end,
the reamer comprising a blade on a tool front end side, wherein the blade is made of a cemented carbide including metal carbide particles, the blade has on a circumferential surface:
- a chamfered cutting edge located on the tool front end side,
- a circumferential cutting edge contiguous to an end of the chamfered cutting edge on a tool rear end side, and
- a margin that is a surface contiguous to the circumferential cutting edge, a flute is formed at the circumferential surface of the blade, the circumferential cutting edge is formed at a ridgeline of the margin and the flute, the circumferential cutting edge includes a front end portion between a first position and a second position, the first position being an end on a chamfered cutting edge side, the second position having a distance of 1 mm from the first position in a direction of extension of the circumferential cutting edge, and as viewed from a direction passing through the central axis and the circumferential cutting edge and being orthogonal to the central axis, the circumferential cutting edge at the front end portion in an as-manufactured state does have a chipping that extends from the circumferential cutting edge to the margin and that is less than 10 μm when measured in a direction orthogonal to the direction of extension of the circumferential cutting edge.

2. The reamer according to claim 1, wherein the blade is back tapered such that a diameter of a circumcircle of the blade in a cross-section orthogonal to the central axis decreases by not less than 0.05 mm as a distance from the tool front end increases per 100 mm.

3. The reamer according to claim 2, wherein
the metal carbide particles have a mean particle size of not greater than 0.8 μm.

4. The reamer according to claim 1, wherein
the metal carbide particles have a mean particle size of not greater than 0.8 μm.

* * * * *